United States Patent [19]

Meyer, Jr.

[11] Patent Number: 4,604,809
[45] Date of Patent: Aug. 12, 1986

[54] GAGE HEAD ACTUATING COUPLER

[76] Inventor: Franklin Meyer, Jr., P.O. Box 1, Forestdale, R.I. 02024

[21] Appl. No.: 720,088

[22] Filed: Apr. 5, 1985

[51] Int. Cl.⁴ ............................ G01B 5/12; G01B 7/12
[52] U.S. Cl. .................................. 33/178 E; 33/147 F
[58] Field of Search ............ 33/147 F, 147 N, 148 H, 33/149 J, 178 E

[56] References Cited

U.S. PATENT DOCUMENTS

| | | | |
|---|---|---|---|
| 1,624,654 | 4/1927 | Brittain, Jr. | 33/147 F |
| 1,652,854 | 12/1977 | Darlington | 33/178 R |
| 4,067,114 | 1/1978 | Meyer, Jr. | 33/178 R |
| 4,367,592 | 1/1983 | Thompson | 33/178 E |

FOREIGN PATENT DOCUMENTS 2813842 10/1978 Fed. Rep. of Germany .... 33/178 E

Primary Examiner—Richard R. Stearns
Attorney, Agent, or Firm—Maurice R. Boiteau

[57] ABSTRACT

A coupler interconnects an expanding plug gage head with an electronic amplifying and displaying device. The gage head includes a tapered plunger which is pressed into an internal socket to expand the plug gage. The coupler includes a transducer which electrically relays the position of the tapered plunger to an electronic amplifying/indicating device. The coupler is interconnected with the plunger and includes a spring for imparting to the plunger a plug gage expanding force. The coupler also includes a slotted lever to which the plunger is connected and which is manually actuated to retract the plunger for contracting the plug gage preparatory to its insertion into a bore to be measured in a workpiece.

5 Claims, 2 Drawing Figures

U.S. Patent  Aug. 12, 1986  4,604,809
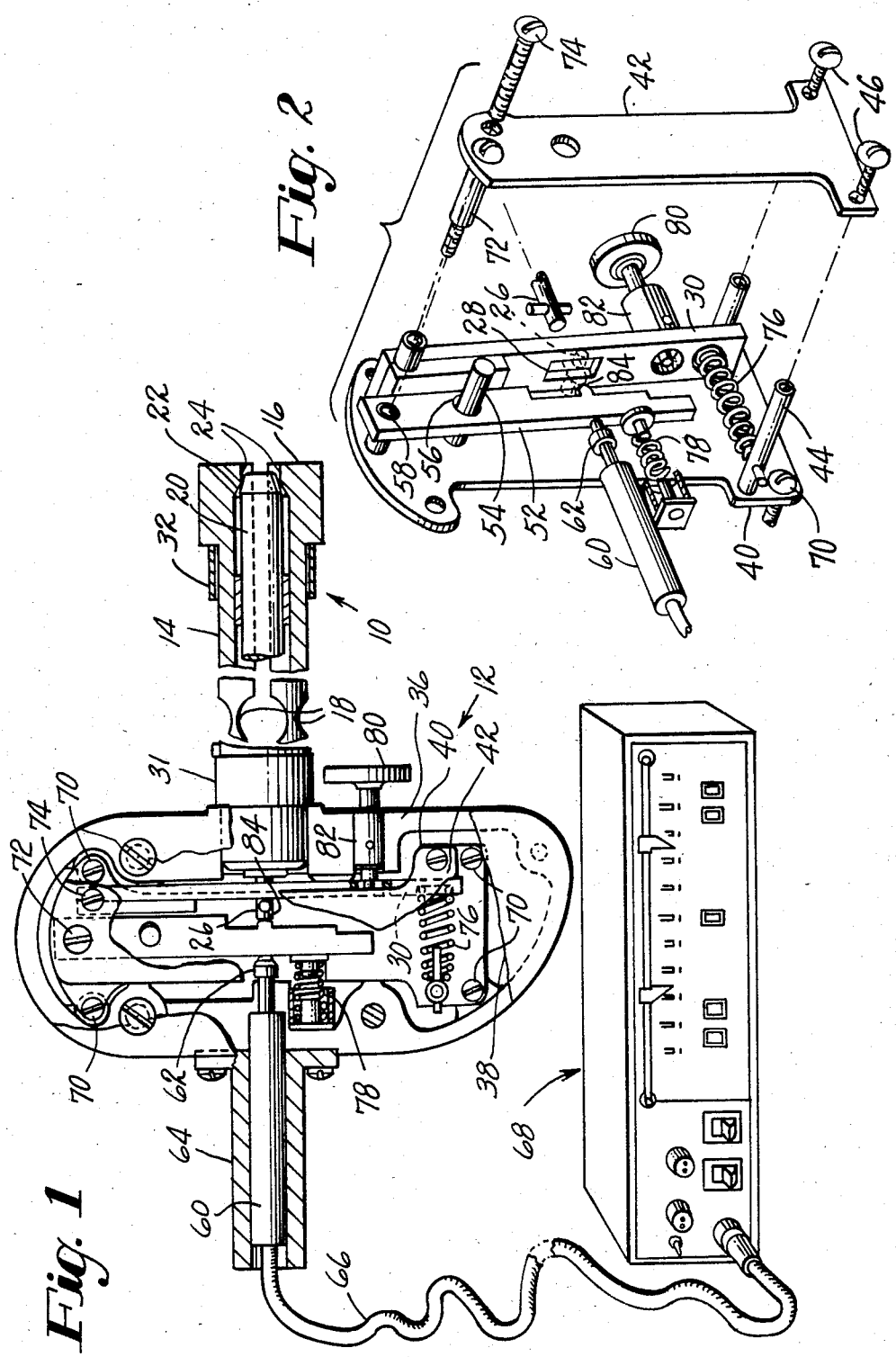

GAGE HEAD ACTUATING COUPLER

The present invention relates generally to couplers for expanding or contracting gage heads and for cooperating with an electronic amplifying indicator in the translation and amplification of the dimension sensed by the gage head to provide a size indication displayed upon a dial of the indicator. More particularly, the invention relates to improvements in couplers adapted to being employed with gage heads each including a tapered plunger which causes the head either to contract or to expand, depending upon the head design or type and which, by the longitudinal position of the plunger, translates the dimension being sensed by the gage head to an electronic transducer or pick-up which in turn relays the size information as an electrical signal to an amplifying device where the deviation from a basic dimension is displayed on a graduated scale.

In manufacturing operations involving precision machining, it is desirable, not only to determine that a dimension of a workpiece lies within an applicable tolerance band established for that dimension, but also its exact location within the band. In addition, in order to provide data for statistical analysis of part dimensions, it is necessary that a record be compiled of the exact measurement of a dimension as taken from a substantial sample if not all workpieces. The compilation of the record may be accomplished manually but such a practice is not only slow and labor intensive but also subject to the introduction of numerous errors in recording observed measurements, thus rendering the whole record far less reliable. In order to improve the reliability of such records and to reduce the expenditure of labor involved in their compilation, it has been proposed that measurements be taken with a combination of instrumentalities which produces an electrical output signal proportional to the measure dimension. Such an output signal may be displayed on the dial of an electronic amplifying gage for immediate decision by an inspector or operator that the workpiece either conforms or does not conform to the size limits for the dimension being measured and additionally may readily be interconnected with a computer or other recording device for storing information concerning a multiplicity of successive size measurements and either simultaneously or thereafter producing a printed analytical record.

Various gage heads such as those disclosed in my U.S. Pat. No. 3,940,856 issued Mar. 2, 1976 for Ring Gages, U.S. Pat. No. 4,067,114 issued Jan. 10, 1978, U.S. Pat. No. 4,389,789, issued June 28, 1983 for Variable Amplification Expanding Plug Gage and U.S. Pat. No. 4,434,557 for Indicator Snap Gage Assemblies. Each of the above identified gage heads includes a tapered plunger which, by being pressed toward the workpiece-engaging surfaces of the head, conditions the head, either contracting or expanding it, depending on type to engage the workpiece. Additionally, the tapered plunger, by its longitudinal position normally assists in amplifying and interpreting the dimension being measured. Although such gage heads seem especially suitable for electronic gaging, a number of difficulties have heretofore interfered with their successful combination with electronic amplifying and displaying devices adapted to being connected to recorders or computers for compiling useful records. A serious difficulty is that the various gage heads such as those already described are intended to be employed primarily with conventional mechanical amplifier/indicators such as that disclosed in U.S. Pat. No. 1,652,854, issued Dec. 15, 1927 in the name of Philip J. Darlington. The Darlington amplifier/indicator is a self-contained unit adapted to being coupled to gage heads such as those above identified, by being connected to the tapered plungers of the heads. These amplifier/indicators include spring means for applying an axial force to the plunger in the direction of the workpiece-engaging end of the gage head and also include a manually operable retractor for the plunger. Since the conventional amplifier indicators are self contained, they not only provide their own internal amplification but also include internal parts which interfere with the location of electronic transducers.

It is accordingly a general object of the present invention to provide for the reliable measurement of a given dimension on a succession of like workpieces and the compilation of a record of the individual measurements.

A more particular object is to combine gaging heads of familiar design and reliably accurate performance with electronic amplification, display and recording instruments.

Another object is to provide coupling of a transducer to a gage head without interfering with the normal functioning of either element of the combination.

In the achievement of the foregoing objects, a feature of the invention relates to a coupler which provides a mounting for a transducer for interconnecting an expandable/contractible gage head to an electronic amplifier/indicator. In the coupler, the transducer is typically mounted in axial alignment with the gage head and positioned to translate directly any change in the axial orientation of the tapered plunger into an electrical signal fed to an electronic amplification and display device.

Other features of the invention relate to connections in the coupler for pressing the operating tapered plunger of the gage head toward its workpiece-engaging end and for retracting the plunger to permit the head to be engaged with the workpiece. This is accomplished without interfering with the coupling of the plunger to the transducer but while providing a conveniently located manually engageable plunger retractor.

The foregoing objects and features, together with numerous advantages flowing from the present invention, will be clarified from the following detailed description of an illustrative embodiment taken in connection with the accompanying drawings in which:

FIG. 1 is a view in side elevation of a coupler according to the present invention shown approximately full scale with a portion of its cover broken away for clarity and combined with a gage head and connected electrically to an electronic amplifying device shown on a reduced scale; and FIG. 2 is a detail view in perspective, depicting internal parts of the coupler of FIG. 1, shown in separated relationship for clarity.

Turning now to the drawings, there is shown in FIG. 1 an expanding plug gage head indicated at 10 and of generally conventional design mounted on a coupler indicated generally at 12. The gage head 10 includes a split and expandable gage body 14 formed with an enlarged workpiece-engaging end 16 and an integral hinge 18. In a conventional manner, the end 16 is expanded to contact typically an internal bore in a workpiece by a tapered plunger 20 which is axially slidable in the body 14 and pressed toward the end 16 to bring its tapered tip 22 into engagement with a split internal socket 24. The opposite end of the plunger is shaped in the form of a cross-head 26 which passes through a rectangular opening 28 in a lever 30 as best shown in FIG. 2. Additionally, the head 10 includes a positioning bushing 31 for establishing the location of the head with respect to the coupler 12 and a collar 32 for limiting the expansion of the end 16.

The gage head already described is of generally conventional construction whose measuring end is expanded by motion of the plunger 20 toward the end 16 and contracted when the plunger is retracted. It will be appreciated that gage heads according to my above identified patent and various applications may be readily substituted for the plug gage head 10 without departing from the spirit of the present invention. The substitution is appropriate even though in some cass as when the gage head is a ring gage assembly in which the effects of plunger motion are reversed causing contraction of the ring from the pressure of the tapered plunger end in the socket and causing the ring to expand when the plunger is retracted.

The coupler 12 is housed in a two part case including a back 36 and a front cover 38 having an outline to coincide with that of the back but broken away for clarity in FIG. 1. There is fixedly secured to the interior of the back 36, a pillar plate 40 which, with a top plate 42, provides a supporting structure for moving parts of the coupler 12. The plate 42 is secured in spaced relationship to the pillar plate 40, at one end, by two separator posts 44 extending outwardly from the pillar plate and internally threaded to receive screws 46 which pass loosely through openings in the plate 42. Mounted between the plates 40 and 42 is a lever 52 which is pivoted and forms a connection between the plunger 20 and the electronic portion of the gage assembly. The lever 52 is limited in its movement by a stop post 54 extending forwardly from the plate 40 and passing loosely through an opening 56 in the lever, which allows, by its clearance with the post, sufficient movement to cover the range for which the gage is designed. There is provided an internally threaded post 58 secured between the plates 40 and 42, upon which the lever 42 is pivoted.

The lever 52 is interconnected to a transducer 60 which may be of a commercial type such as a model LVDT, distributed by Edmunds Gage of Farmington, Conn. The transducer 60 includes a plunger 62 which contacts the lever 52 and has a maximum travel of 0.100 inch for a full range of electronic gage measurement. The transducer 60 is secured in a flanged bushing 64 fixedly mounted upon the case comprising the base 36 and the cover 38. The output of the transducer 60 is connected by a cable 66 to an amplifier-indicator 68. When the plunger 62 is moved a total distance of 0.100 inch, the showing on the indicator 68 is a full range of 0.025 inch, a tolerance band of 0.0125 plus or minus.

The pillar plate 40 is secured within the case 36, 38 by a number of short screws 70 passing loosely through openings in the plate and into threaded engagement with tapped holes in the base 36. The plate 42 is fixedly mounted in spaced relation with the plate 40 by the separator posts 44, already described and also by tapped post 58 into which is received the threaded end of a shoulder screw 72. The lever 30 is pivoted on a post into which a screw 74 is engaged and is urged in a counterclockwise direction, as seen in FIG. 1, by a compression spring 76. The lever 52 is similarly biased by compression spring 78. For retracting the plunger 20, there is provided a push button 80 slidable in a bushing 82 and engaging the lever 30. The cross head 26 of the plunger 20 engages a contact surface 84 formed on one side of the lever 52 generally in alignment with the axis of the transducer plunger 62.

From the foregoing description of an illustrative embodiment, taken with the accompanying drawings, certain variations within the scope of the present invention will become readily apparent to those of ordinary skill in the gaging art. It is accordingly not intended that the present specification be taken in a limiting sense but rather that the scope of the invention be measured in terms of the appended claims.

Having thus disclosed my invention, what I claim as new and desire to secure by Letters Patent of the United States is:

1. An actuator for an expanding and contracting gage head operated by an axially movable plunger having a tapered operating end and a cross head at the other end, comprising a case, a retracting lever, a transducer coupling lever, a supporting structure fixedly secured within the case providing pivots for the levers, the side of the retracting lever remote from the gage head being in engagement with the cross head, means for mounting said gage head and defining an axis for the case, a contact surface on the coupling lever for the other end of the plunger, a transducer defining on axis fixed to the case in alignment with said axis of the case and being in engagement with said coupling lever, and means for actuating the retracting lever for withdrawing the plunger in a direction away from the gage head.

2. An actuator according to claim 1 further comprising a bushing affixed to the case for receiving the transducer.

3. An actuator according to claim 1 further comprising a manually operable push button in engagement with the retracting lever for withdrawing the plunger.

4. An actuator according to claim 1 further characterized in that the supporting structure comprises a pair of plates secured to the case in spaced apart relationship, between which plates the levers are mounted.

5. An actuator according to claim 4 further comprising a bushing fixedly mounted on the case for supporting the transducer in alignment with the axis.

* * * * *